United States Patent [19]

Maat et al.

[11] Patent Number: 5,108,765

[45] Date of Patent: Apr. 28, 1992

[54] COMPOSITION FOR IMPROVING THE PROPERTIES OF DOUGH AND METHOD OF USING SAME

[75] Inventors: Jan Maat, Monster; Martinus Roza, Strijen, both of Netherlands

[73] Assignee: Van den Bergh Foods Co., Lisle, Ill.

[21] Appl. No.: 498,260

[22] Filed: Mar. 23, 1990

Related U.S. Application Data

[63] Continuation-in-part of Ser. No. 485,416, Feb. 27, 1990, abandoned.

[30] Foreign Application Priority Data

Mar. 23, 1989 [GB] United Kingdom ............... 8906837

[51] Int. Cl.$^5$ .......................... A21D 2/00; A21D 8/04
[52] U.S. Cl. ......................................... 426/20; 426/62; 426/64; 426/549
[58] Field of Search .................... 426/20, 61, 62, 64, 426/549

[56] References Cited

U.S. PATENT DOCUMENTS

| | | | |
|---|---|---|---|
| 1,994,993 | 3/1938 | Haas et al. | 426/20 |
| 2,744,017 | 5/1956 | Baldwin. | |
| 2,783,150 | 2/1957 | Luther | 426/61 |
| 3,392,030 | 7/1968 | Eltz. | |
| 3,511,992 | 5/1970 | Cooke et al.. | |
| 3,934,040 | 1/1976 | Smerak et al. | 426/20 |
| 3,983,002 | 9/1976 | Ohya et al. | 435/209 |
| 4,996,062 | 2/1991 | Lehtonen et al. | 426/61 |

FOREIGN PATENT DOCUMENTS

| | | |
|---|---|---|
| 338452 | 10/1989 | European Pat. Off.. |
| 0368015 | 5/1990 | European Pat. Off.. |
| 2615392 | 3/1977 | Fed. Rep. of Germany. |
| 2227368 | 6/1978 | Fed. Rep. of Germany. |
| 57-058844 | 4/1982 | Japan. |
| 57-086235 | 5/1982 | Japan. |
| 8401771 | 1/1986 | Netherlands. |
| 787225 | 12/1957 | United Kingdom. |

OTHER PUBLICATIONS

Dialog Data Base, File 350: WPI, Dialog Accession No. 1913146, Abstracting JP 54160787 of Dec. 19, 1979.
P. Huhtanen Journal of Agricultural Science in Finland European Search Report.
FSTA DM 82-08-M0890 Abstracting "Improvement of baking properties of wheat flours by addition of horseradish peroxidase, hydrogen peroxide and phenols" in Zeitschrift fur Lebensmittel-Untersuchung und Forschung, 1981, 173(5) 376-379.

Primary Examiner—Donald E. Czaja
Assistant Examiner—Jean L. Aberle
Attorney, Agent, or Firm—Rimma Mitelman

[57] ABSTRACT

A composition is disclosed which comprises cellulase, xylanase, peroxidase, and optionally an oxidase. The composition may be incorporated in flour as an additive to dough for bread or other baked dough products such as puff pastry. Flour compositions comprising a bread improver composition of cellulase, peroxidase and optionally an oxidase, and process for improving baked goods by using same are also shown.

19 Claims, No Drawings

COMPOSITION FOR IMPROVING THE PROPERTIES OF DOUGH AND METHOD OF USING SAME

This is a continuation-in-part application of Ser. No. 485,416, filed Feb. 27, 1990, now abandoned.

This invention relates to additives for improving baked goods, particularly bread improvers, based on cellulolytic enzymes.

BACKGROUND OF THE INVENTION

The term cellulolytic enzyme is generic for enzymes degrading cellulose. Examples of such enzymes are enzymes, that catalyze the hydrolysis of hexosepolymers such as cellulases and those, that catalyze the hydrolysis of pentose-polymers such as arabino-xylans, xylanases, arabinases and so forth. The addition to dough from which bakers goods are baked of such enzymes, usually in the commercial preparation as a mixture of several enzymes, provides improving effects such as increase in specific volume, anti-staling improvement in crumb structure.

Although the addition of cellulolytic enzymes to bread is not permitted in various countries, they are in many cases present in the bread, because the amylases, which are permitted additives in bread making, contain these enzymes.

SUMMARY OF THE INVENTION

The presence of cellulolytic enzyme for example cellulase in alpha amylase comprising the active ingredient in a variety of enzyme-based bread improvers, gives rise to undesired side effects at higher concentrations used to provide these improvements in the greatest degree. In particular dough strength is reduced. The present invention proposes to overcome the disadvantage provided by the presence of cellulase in bread improver formulations by the inclusion of sufficient glucose oxidase and or peroxidase to inhibit its disadvantageous effects.

The invention may be applied as an additive with xylanase providing a mixture with other ingredients to be incorporated in dough for bread making or for example in puff pastry dough.

The use of glucose oxidase as a bread additive has been already proposed in the form of ascorbic acid and/or reductic acid admixed with a glucose-oxidase-containing preparation together with inert fillers, to improve the baking qualities of flour and dough, the glucose-oxidase being extracted for instance from module such as A. niger, described in British patent 787225. More recently, dough conditioners are described in U.S. Pat. No. 3,392,030 comprising dehydro forms of enediols of 3-ketoglycosides optionally admixed with glucose-oxidase to provide bread improver compositions, the glucose-oxidase providing for the preparation in situ of $H_2O_2$.

Food compositions such as dehydrated egg products, cereals and the like may be stabilised according to U.S. Pat. No. 2,744,017, by the addition of glucose oxidase to effect the removal of glucose. The free oxygen for effecting the enzymatic conversion of the aldose is provided by the inclusion of catalase together with a continuous addition of hydrogen peroxide.

Glucose oxidase is added together with cystine and catalase to bread dough according to a method for improving the quality of bread described in JP 57086235 and JP 57058844 and a comparison is made with the effect of adding calcium bromate and ascorbic acid, according to JP 57047434.

The effect of lipoxygenase and glucose oxidase on the rheological properties of dough are described in the abstract of the International Congress of Food Science and Technology (1978), page 235.

U.S. Pat. No. 3,512,992 describes an enzyme additive having pentosanase activity to improve resistance to staling, catalase being present to improve whiteness. German patent 2227368 also describes enzyme additives containing amylase, protease and pentosanase.

According to U.S. Pat. No. 3,934,040 an additive for standard doughs comprises cysteine ascorbic acid and fungal enzymes e.g. alpha amylase, protease, etc.

DE 26 15 392 describes a baking improver additive comprising cysteine, and ascorbic acid which may also contain hydrolase enzymes e.g. carbohydrase or amylase.

Netherlands Patent 8401771 describes improving baking flours by increasing the enzyme activities of amylase, glucanase and xylanase in malt added to the flour.

In an article of P. Huhtanen c.s. in J. of Agricult. Sc. in Finland vol. 57 (1985) 284–292 the use of a mixture of cellulase and glucose oxidase as silage additive is described.

DETAILED DESCRIPTION OF THE INVENTION

The ratio of glucose oxidase or peroxidase to xylanase in bread improver compositions according to the present invention is not critical but the amount of glucose oxidase or peroxidase is preferably more than 1 ppm by weight of flour, preferably 1 to 10 ppm. 1 ppm corresponds with 125 units per mg. glucose oxidase or 210 purpurogallin units per mg peroxidase. The amount of additive expressed as final concentration on flour that may be used is preferably from 50 to 500 parts per million. Sufficient xylanase is preferably present to produce substantially maximum effect on specific volume.

The compositions contains preferably a sugar, in particular glucose as substrate for the glucose oxidase. Therefore the flour composition normally contains 0.05–5 wt % added sugar, preferably 0.1–2 wt % of added glucose.

The mixture of xylanase and glucose oxidase or peroxidase may be included in a bread improver composition containing further components, for example fat, additional enzymes, oxidising or reducing agents, sugars, emulsifiers, thickeners or gums and soya flour may be included. Additional enzymes may be included e.g. amylases, proteases, phospholipases and lipoxygenases.

EXAMPLE

A series of tests were conducted to compare the influence of glucose oxidase and horseradish peroxidase with xylanase on the stability of bread dough, prepared according to the following recipe:

|  | Parts by weight | |
|---|---|---|
| Wheat Flour | 100 | |
| Yeast (compressed) | 5 | |
| Water | 58 | |
| Salt | 2 | |
| Glucose | 0.5 | (substrate glucose oxidase) |

The dough was mixed over 25 minutes in an Artofex mixer at 27° C. First and second proofs were conducted after 10 minutes each, with a final proof at 45 or 60 minutes. Bread rolls were prepared by baking the dough for 20 minutes at 240° C.

A series of samples were prepared as follows:

| Sample | | |
|---|---|---|
| A | xylanase 200 ppm | |
| B | xylanase 200 ppm | Glucose oxidase 1 ppm |
| C | xylanase 200 ppm | Glucose oxidase 2 ppm |
| D | xylanase 200 ppm | Horse Radish peroxidase 1 ppm |
| E | xylanase 200 ppm | Horse Radish peroxidase 2 ppm |
| Blank | | |

Both the dough and the baked rolls were tested. Results appear in the accompanying Table.

Dough property after mixing was soft and dry for all samples except the Blank which was tough and dry. After moulding, slight stickiness on the surface of the dough was observed only with the xylanase control (A) and the test with 1 ppm oxidase (B). Dough softness was also exhibited after moulding by these two products, the remaining tests all being firm except for the blank which was tough.

The best stability was exhibited with the sample containing 2 ppm oxidase with the xylanase and this sample after baking also exhibited a more regular structure, better specific volumes and appearance for both final proof times than the remaining tests. In conclusion this sample has in all respects improved dough properties over the remainder.

| | | PERFORMANCE | | | | | |
|---|---|---|---|---|---|---|---|
| | Property | A | B | C | D | E | Blank |
| Results on dough Times of sampling | | | | | | | |
| Directly after mixing (Kneading) | Workability | + | + | ++ | + | + | − |
| | Elasticity | + | + | ++ | + | + | − |
| Directly after molding | Stickiness | − | − | + | + | + | + |
| | Softness | − | − | + | + | + | − |
| Transport to oven | Stability | − | − | ++ | − | + | ND |
| Results on product | Crust color | + | + | + | + | + | − |
| | Structure | − | − | + | − | − | − |
| | Volume (45') | 5.31 | 5.24 | 5.35 | 5.10 | 5.17 | 4.03 |
| | Volume (60') | 4.86 | 4.73 | 4.87 | 4.57 | 4.64 | 3.58 |
| | Appearance (45') | 7 | 7 | 9 | 7 | 8 | 5 |
| | Appearance (60') | 4 | 4 | 6 | 5 | 5 | 2 |

What is claimed is:

1. Bread improver composition comprising cellulase in a sufficient amount to produce substantially maximum effect on specific volume of the dough, sufficient peroxidase to inhibit disadvantageous effects of cellulase, and xylanase.

2. The composition according to claim 1 in which the composition also comprises an oxidase.

3. The composition according to claim 2, in which the oxidase is glucose oxidase.

4. The composition according to claim 1, in which the composition also comprises a sugar.

5. The composition according to claim 4 wherein the composition comprises glucose as the sugar.

6. The composition according to claim 2 wherein the composition further comprises sugar.

7. Flour composition comprising a bread improver composition which comprises cellulase in a sufficient amount to produce substantially maximum effect on specific volume of the dough and sufficient oxidase and peroxidase to inhibit disadvantageous effects of cellulase.

8. The composition according to claim 7 comprising at least 1 ppm of oxidase and peroxidase.

9. The flour composition according to claim 7 wherein the flour also contains 0.5-5 wt % of added sugar.

10. The composition according to claim 9, wherein the flour contains 0.1-2 wt % of added glucose.

11. Dough composition containing the flour composition claimed in claim 7.

12. Baked goods comprising the dough as claimed in claim 11.

13. Process for improving bread baked from dough which comprises incorporating into the bread dough an improver comprising cellulase in a sufficient amount to produce substantially maximum effect on specific volume of the dough and sufficient oxidase and peroxidase to inhibit disadvantageous effects of cellulase, and a sugar.

14. The flour composition according to claim 8 wherein the flour further contains 0.05-5 wt % of added sugar.

15. Dough composition comprising the flour composition of claim 8.

16. Dough composition comprising the flour composition of claim 9.

17. Dough composition comprising the flour composition of claim 10.

18. Flour composition incorporating a bread improver composition which contains cellulase in a sufficient amount to produce substantially maximum effect on specific volume of the dough and sufficient peroxidase to inhibit disadvantageous effects of cellulase.

19. Process for improving baked goods baked from dough which comprises incorporating into the dough an improver comprising cellulase in a sufficient amount to produce substantially maximum effect on specific volume of the dough and sufficient peroxidase, and a sugar.

* * * * *